US012682601B2

(12) United States Patent
Liu

(10) Patent No.: US 12,682,601 B2
(45) Date of Patent: Jul. 14, 2026

(54) IMAGE DETECTION METHOD, ELECTRONIC DEVICE, AND STORAGE MEDIUM

(71) Applicant: HON HAI PRECISION INDUSTRY CO., LTD., New Taipei (TW)

(72) Inventor: Shiaw-Herng Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 465 days.

(21) Appl. No.: 17/895,508

(22) Filed: Aug. 25, 2022

(65) Prior Publication Data

US 2023/0230347 A1 Jul. 20, 2023

(30) Foreign Application Priority Data

Jan. 19, 2022 (CN) .......................... 202210062298.3

(51) Int. Cl.
G06V 10/74 (2022.01)
B60Q 9/00 (2006.01)
(Continued)

(52) U.S. Cl.
CPC ........... G06V 10/761 (2022.01); B60Q 9/008 (2013.01); B60R 1/24 (2022.01); G01S 17/86 (2020.01); G01S 17/931 (2020.01); G06T 7/74 (2017.01); G06V 10/751 (2022.01); G06V 20/41 (2022.01); G06V 20/58 (2022.01); G06V 20/588 (2022.01); G06V 20/62 (2022.01); B60R 2300/105 (2013.01); B60R 2300/20 (2013.01);
(Continued)

(58) Field of Classification Search
None
See application file for complete search history.

(56) References Cited

U.S. PATENT DOCUMENTS

2014/0064602 A1* 3/2014 Li ........................ G06V 40/107
382/154
2021/0031763 A1* 2/2021 Takaki ................... G06V 20/58
(Continued)

FOREIGN PATENT DOCUMENTS

CN 110163908 8/2019
CN 110163908 A * 8/2019 ............... G06T 7/70
(Continued)

OTHER PUBLICATIONS

Sun et al., "Distance Measurement System Based on Binocular Stereo Vision", DOI:10.1088/1755-1315/252/5/052051 (Year: 2019).*
Cv.stereoRectify Function Documentation, https://amroamroamro.github.io/mexopencv/matlab/cv.stereoRectify.html (Year: 2020).*

*Primary Examiner* — Chan S Park
*Assistant Examiner* — Promotto Tajrian Islam
(74) *Attorney, Agent, or Firm* — ScienBiziP, P.C.

(57) ABSTRACT

An image detection method determines a target object. A plurality of original images of a scene in front of a vehicle are obtained. An object in one original image is detected, and a degree of similarity between the object in the original image and the target object in a preset image is calculated. If the degree of similarity is greater than a preset similarity threshold, it is determined that the original image is a target image and the object is the target object. A position of the target object relative to the vehicle is determined and output. The method can recognize objects of interest in front of a driver.

15 Claims, 3 Drawing Sheets

Determine a target object — S1

Obtain a plurality of original images of a scene in front of the vehicle, and detect a target image includeing the target object from the plurality of original images — S2

Determine a position of the target object relative to the vehicle — S3

Output the position of the target object relative to the vehicle — S4

(51) Int. Cl.

| | | |
|---|---|---|
| *B60R 1/24* | (2022.01) | |
| *G01S 17/86* | (2020.01) | |
| *G01S 17/931* | (2020.01) | |
| *G06T 7/73* | (2017.01) | |
| *G06V 10/75* | (2022.01) | |
| *G06V 20/40* | (2022.01) | |
| *G06V 20/56* | (2022.01) | |
| *G06V 20/58* | (2022.01) | |
| *G06V 20/62* | (2022.01) | |
| *H04N 5/77* | (2006.01) | |

(52) U.S. Cl.
CPC ............... *G06T 2207/30244* (2013.01); *G06T 2207/30256* (2013.01); *G06V 2201/07* (2022.01); *H04N 5/77* (2013.01)

(56) References Cited

U.S. PATENT DOCUMENTS

| | | | | |
|---|---|---|---|---|
| 2021/0334569 A1* | 10/2021 | Fang | .................... | G06V 40/171 |
| 2022/0299627 A1* | 9/2022 | Mekki | .................... | G01S 7/417 |
| 2022/0343532 A1* | 10/2022 | Xie | ........................... | G06T 7/70 |
| 2024/0220533 A1* | 7/2024 | Luo | ......................... | G06F 16/58 |

FOREIGN PATENT DOCUMENTS

| | | | | |
|---|---|---|---|---|
| CN | 111738362 | | 10/2020 | |
| CN | 113312508 | | 8/2021 | |
| JP | 2013114596 | A * | 6/2013 | |
| JP | 2016130979 | A * | 6/2017 | |
| TW | 202141438 | | 11/2021 | |

* cited by examiner

IMAGE DETECTION METHOD, ELECTRONIC DEVICE, AND STORAGE MEDIUM

FIELD

The subject matter herein generally relates to image processing, specifically an image detection method for a vehicle, an electronic device, and a storage medium.

BACKGROUND

A vehicle may provide assisted driving functions for drivers, such as lane departure warning (LDW) and forward collision warning (FCW). Detection of target objects in a scene in front of the vehicle may be needed in some cases.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure. However, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Figure 1:
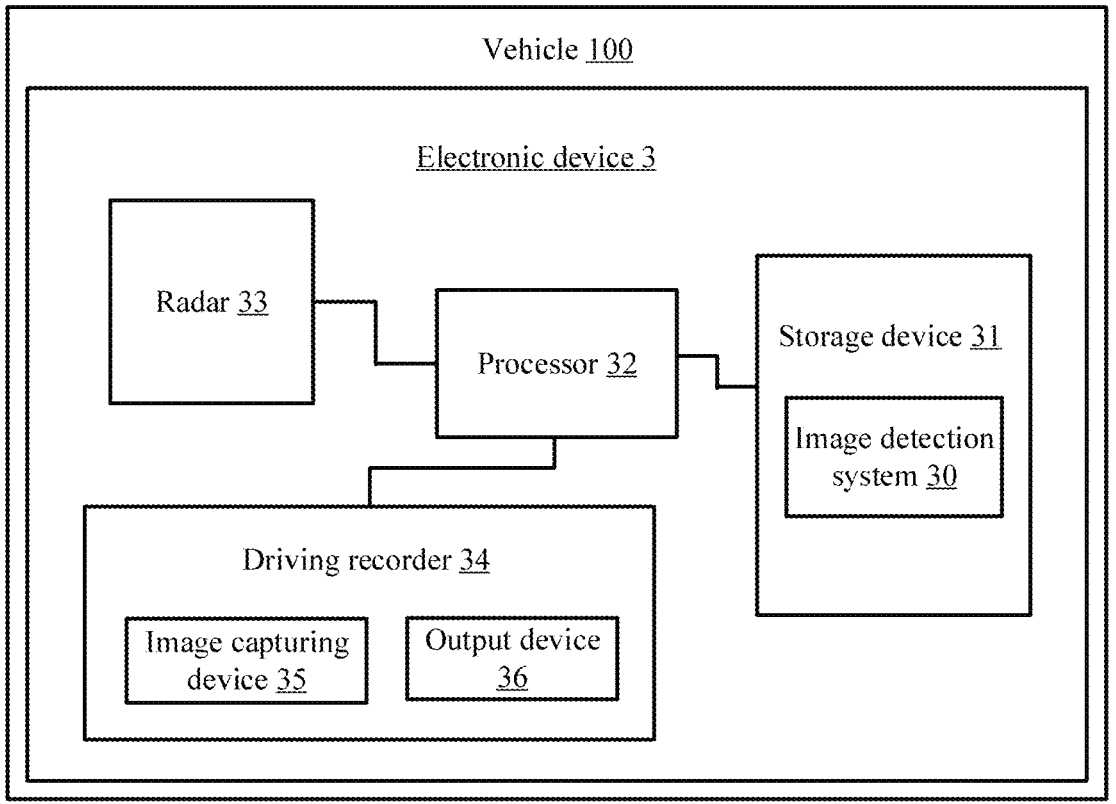
FIG. 1 is a block diagram of an electronic device installed in a vehicle provided in one embodiment of the present disclosure.

FIG. 1 is a block diagram of an electronic device installed in a vehicle provided in one embodiment of the present disclosure.

In the embodiment, the electronic device 3 includes a storage device 31, at least one processor 32, a radar 33, and a driving recorder 34. The processor 32 are electrically connected to the storage device 31, the radar 33, and the driving recorder 34. An image detection system 30 may be stored in the storage device 31 and executable by the processor 32.

Those skilled in the art will understand that the electronic device 3 is only an example, and does not constitute a limitation. Other examples of the electronic device 3 may include more or fewer components than shown in FIG. 1, or combine some components, or have different components.

The storage device 31 may be used to store program codes of computer programs image detection system 30 and original images recorded by the driving recorder 34. The storage device 31 may include a read-only memory (ROM), a programmable read-only memory (PROM), an erasable programmable read-only memory (EPROM), one-time programmable read-only memory (OTPROM), electronically erasable programmable read-Only memory (EEPROM), compact disc read-only memory (CD-ROM) or other optical disk storage, magnetic disk storage, magnetic tape storage, or any other non-volatile computer-readable storage medium that can be used to store data.

The processor 32 may consist of one or more integrated circuits. The processor 32 may include a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 32 may be a control center of the electronic device 3, and connect various parts of the entire electronic device 3 by using various interfaces and lines.

The radar 33 may be used to detect a position of a target object relative to the vehicle 100.

In the embodiment, the driving recorder 34 includes an image capturing device 35 and an output device 36. The driving recorder 34 can use the image capturing device 35 to capture original images of a scene in front of the vehicle 100 when a user is driving the vehicle 100. The processor 32 can store the original images in the storage device 31. The processor 32 recognizes a target image including the target object from the original images. The output device 36 can include a display screen and a speaker. The driving recorder 34 can display the original images and the positions of the target object on the display screen. The driving recorder 34 can issue a voice message to notify the position of the target object relative to the vehicle 100.

In one embodiment, the image capturing device 35 may be installed on a front windscreen of the vehicle 100. The image capturing device 35 may include one or two cameras (such as two monocular cameras) that can capture images of speed limit boards and roadways.

The image detection system 30 may be divided into one or more modules, and the one or more modules are stored in the storage device 31 and executed by the processor 32 to complete the image detection method of the present disclosure. The one or more modules can be a series of computer-readable instruction segments capable of performing specific functions, and the instruction segments are used to describe execution processes of the image detection system 30.

When the modules integrated in the electronic device 3 are implemented in the form of software functional units and used as independent units, they can be stored in a non-transitory readable storage medium.

Figure 2:
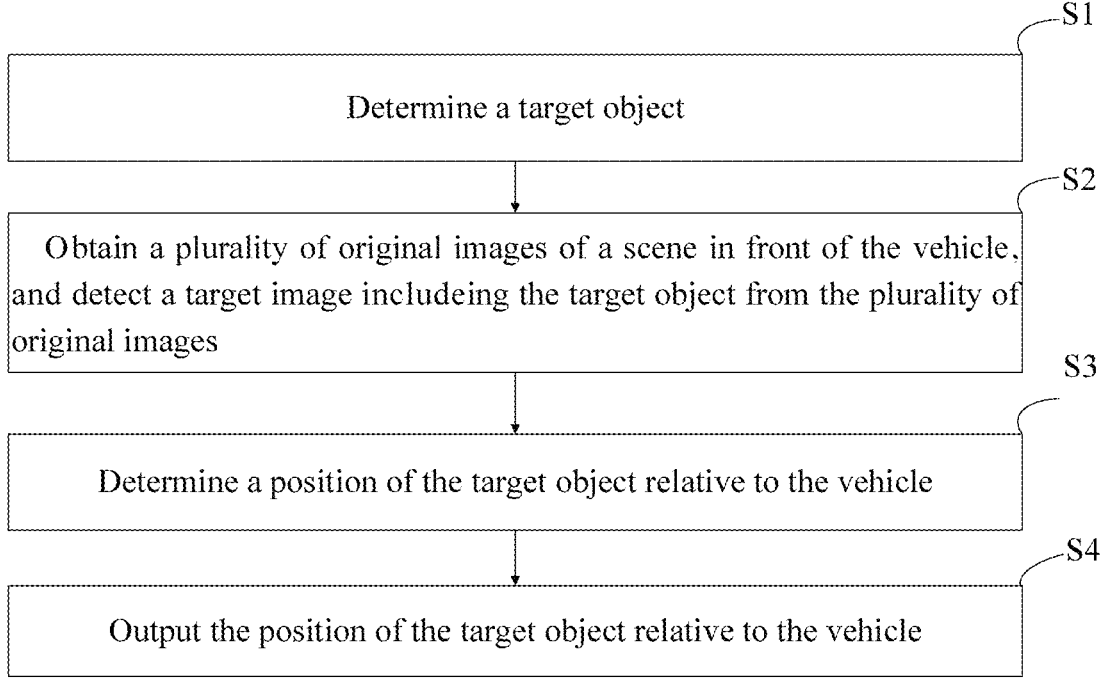
FIG. 2 is a flowchart of an image detection method for a vehicle provided in one embodiment of the present disclosure.

FIG. 2 is a flowchart of an image detection method for a vehicle provided in one embodiment of the present disclosure. The method can recognize objects of interest in front of a driver.

The method may be executed by an electronic device (e.g., electronic device 3 in FIG. 1). The method can be integrated in the electronic device 3, or in a software development kit (SDK) run in the electronic device 3. According to different requirements, the order of the blocks in the flowchart may be changed, and some blocks may be omitted.

In block S1, the electronic device determines a target object.

In one embodiment, the target object includes a character string (e.g., a character string of "bank", "restaurant", or "ATM") and/or a logo (e.g., a logo of a convenience store). The electronic device may determine the target object in response to a user input. The electronic device may pre-store the target object in the storage device of the electronic device or a storage device connected to the electronic device.

In block S2, the electronic device obtains a plurality of original images of a scene in front of the vehicle, and detects a target image including the target object from the plurality of original images.

In one embodiment, the electronic device uses a driving recorder to capture the original images. The electronic device may control the driving recorder to capture a video that records a view through the front windscreen of the vehicle. The electronic device extracts an image sequence from the video, and obtains the original images from the image sequence.

In one embodiment, the electronic device detects an object in one original image. The electronic device calculates a degree of similarity between the object in the original image and the target object in a preset image. If the degree of similarity is greater than a preset similarity threshold (such as 0.95), the electronic device determines that the original image is the target image and the object is the target object.

In one embodiment, the electronic device extracts features of the object in the original image using a feature extraction algorithm, and calculates the degree of similarity between the object in the original image and the target object in the preset image according to the features using a feature matching algorithm.

In one embodiment, before extracting the features of the object in the original image, the electronic device preprocesses the original image. After extracting the features of the object in the original image, the electronic device performs preset operations on the features.

Preprocessing of the original image can include adjusting a size of the original image and normalizing the original image. The electronic device may adjust a center point of the original image, setting it to 0. The preprocessing can reduce interference factors in the original image and highlight feature information in the original image.

The feature extraction algorithm can include a Harris algorithm, a scale-invariant feature transform (SIFT) algorithm, a speeded up robust features (SURF) algorithm, a local binary features (LBF) algorithm, a histogram of oriented gradient (HOG) algorithm, a deformable parts model (DPM) algorithm, etc.

The preset operations may include principal component analysis (PCA), singular value decomposition (SVD), and linear discriminant analysis (LDA), etc. The preset operations can exclude features with less information, so as to reduce calculations of image detection.

In one embodiment, the feature matching algorithm may include a histogram algorithm, a hash algorithm, a structural similarity index algorithm, etc. The structural similarity index algorithm can calculate a structural similarity index between the features of the object and the target object as the degree of similarity.

In another embodiment, the target object includes a road sign (such as a stop sign). The electronic device can detect a target image including the road sign from the original images.

In block S3, the electronic device determines a position of the target object relative to the vehicle.

In one embodiment, the position of the target object relative to the vehicle includes a distance between the target object and the vehicle and a direction of the target object relative to the vehicle.

In one embodiment, the electronic device calculates the distance via light detection and ranging (LiDAR).

In another embodiment, the electronic device obtains first parameters of an image capturing device that captures the plurality of original images and second parameters of the target object in the target image, and calculates the distance according to the first parameters and the second parameters using a monocular vision distance measurement algorithm or a binocular vision distance measurement algorithm. The image capturing device includes two monocular cameras. The first parameters may include internal parameters of the monocular cameras and a relative position of the monocular cameras. The second parameters may include a width of the target object in the target image as seen from the vehicle.

In calculating the distance according to the first parameters and the second parameters using the monocular vision distance measurement algorithm, the electronic device determines a rectangle that encompasses the target object in the target image, and obtains first coordinates of two pixels on either end of a bottom edge of the rectangle according to the second parameters (for example, using a function of Open Source Computer Vision Library (OpenCV) to obtain the coordinates of the two pixels). The first coordinates of the two pixels can be denoted as (u1, v1) and (u2, v2). The first coordinates are coordinates in an image plane. The electronic device determines an external parameter matrix, an internal parameter matrix, and a distortion matrix of the image capturing device according to the first parameters, and obtains second coordinates of the two pixels (x1, y1) and (x2, y2) according to the coordinates (u1, v1) and (u2, v2).). The second coordinates are coordinates in a road plane. The second coordinates are obtained according to a geometrical relationship between the image plane and the road plane. The electronic device calculates the distance using a Euclidean distance formula.

In calculating the distance according to the first parameters and the second parameters using the binocular vision distance measurement algorithm, the electronic device performs binocular correction and binocular matching according to the first parameters and the second parameters, and calculates the distance according to principle of a similar triangle.

The binocular correction may include removing distortion and aligning images obtained by the two monocular cameras, so that the imaging origin coordinates of the two monocular cameras are consistent, optical axes of the two monocular cameras are parallel, left and right imaging planes are coplanar, and epipolar lines are aligned. In this way, any pixel in one image captured by one monocular camera and a corresponding pixel in a corresponding image captured by the other monocular camera have a same row number, and the corresponding pixel can be obtained by one-dimensional search of rows.

The binocular matching can match corresponding pixels in two images captured by the two monocular cameras to obtain a disparity map. According to the disparity map, disparity data of the two images can be calculated. According to disparity data, the distance is easily calculated using the similar triangle principle.

In one embodiment, the electronic device determines a center of the target image, and compares the target object and the center of the target image to determine the direction of the target object relative to the vehicle. In another embodiment, the electronic device determines a road centerline in the target image, and compares the target object and the road centerline to determine the direction of the target object relative to the vehicle. A center of the road centerline may be determined. The target object may be compared to the center of the road centerline to determine the direction of the target object relative to the vehicle.

For example, when the target object is on the left of the center of the target image or, it can be determined that the target object is in the left front of the vehicle. When the target object is located in the right of the center of the target image, it can be determined that the target object is located in the right front of the vehicle.

In block S4, the electronic device outputs the position of the target object relative to the vehicle.

In one embodiment, the electronic device marks the target object and the position of the target object relative to the vehicle in the target image to obtain a marked image, and displays the marked image. In another embodiment, the electronic device issues a voice message to notify driver of the position of the target object relative to the vehicle.

Figure 3:
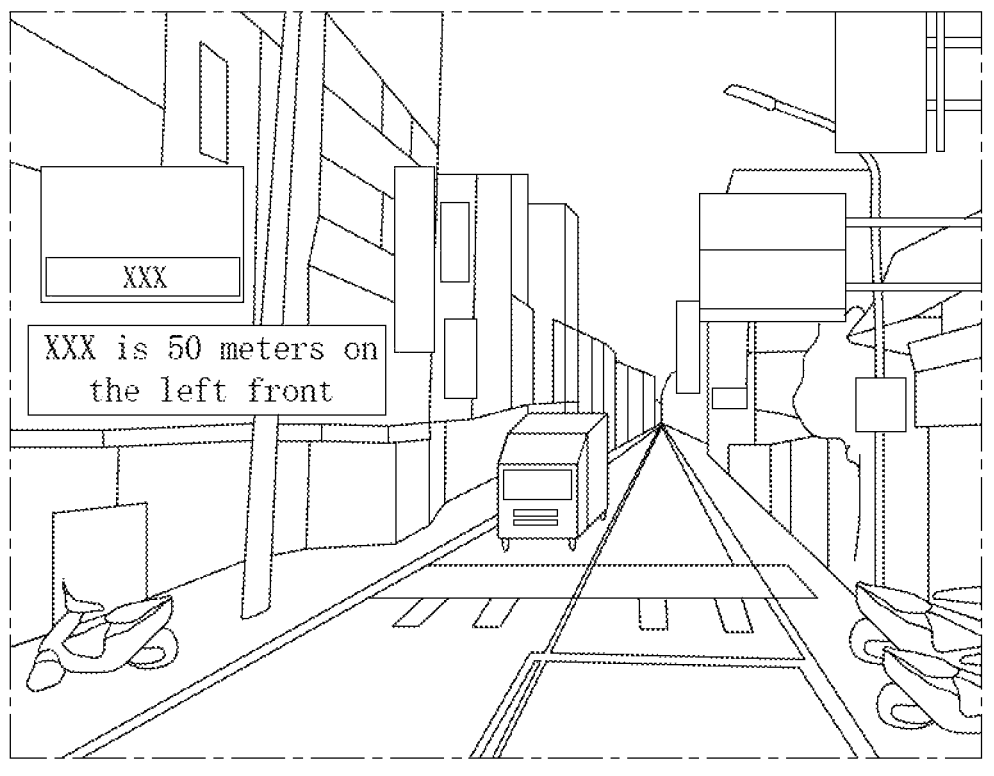
FIG. 3 show a target image with a marked target object in relation to the vehicle.

FIG. 3 show a target image with a marked target object in relation to the vehicle. In the example of FIG. 3, the target object is a character string, the electronic device marks the position of the character string ("XXX is 50 meters on the left front") in the target image.

In several embodiments provided in the preset disclosure, it should be understood that the disclosed electronic device and method may be implemented in other ways. For example, the embodiments of the electronic device described above are merely illustrative. For example, the units are only divided according to logical function, and there may be other manners of division in actual implementation.

The modules described as separate components may or may not be physically separated, and the components displayed as modules may or may not be physical modules, that is, may be located in one or more than one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

I claim:

1. An image detection method for a vehicle, comprising:
determining a target object;
obtaining a plurality of original images of a scene in front of the vehicle;
detecting a target image comprising the target object from the plurality of original images, comprising: detecting an object in one original image of the plurality of original images, calculating a degree of similarity between the object in the original image and the target object in a preset image, and comprising: adjusting a size of the original image and normalizing the original image by adjusting a center point of the original image and setting the center point to zero (0), extracting features of the object in the original image, and performing preset operations on the features to exclude the features with less information; and calculating a structural similarity index between the features of the object and the target object as the degree of similarity by a structural similarity index algorithm; and determining that the original image is the target image and the object is the target object when the degree of similarity is greater than a preset similarity threshold;
determining a position of the target object relative to the vehicle, comprising obtaining first parameters of an image capturing device that captures the plurality of original images and second parameters of the target object in the target image, the image capturing device comprising two monocular cameras, the first parameters comprising internal parameters of the monocular cameras and a relative position of the monocular cameras, and the second parameters comprising a width of the target object in the target image; performing binocular correction according to the first parameters and the second parameters, matching corresponding pixels in two images captured by the two monocular cameras to obtain a disparity map, calculating disparity data of the two images according to the disparity map; according to the disparity data, calculating a distance of the position by using a similar triangle principle;
outputting the position of the target object relative to the vehicle; and
notifying a driver of the vehicle of the position of the target object relative to the vehicle.

7

2. The method of claim 1, wherein the target object comprises a character string and/or a logo.

3. The method of claim 1, wherein obtaining a plurality of original images of a scene in front of the vehicle comprises:

controlling a driving recorder to capture a video of the scene in front of the vehicle;

extracting an image sequence from the video; and obtaining the plurality of original images from the image sequence.

4. The method of claim 1, wherein calculating a degree of similarity between the object in the original image and the target object in a preset image comprises:

extracting features of the object in the original image using a feature extraction algorithm; and calculating the degree of similarity between the object in the original image and the target object in the preset image according to the features using a feature matching algorithm.

5. The method of claim 1, wherein the position of the target object relative to the vehicle comprises a direction of the target object relative to the vehicle, the direction of the target object relative to the vehicle is determined by:

determining a center of the target image, and comparing the target object and the center of the target image to determine the direction of the target object relative to the vehicle; or determining a road centerline in the target image, and comparing the target object and the road centerline to determine the direction of the target object relative to the vehicle.

6. The method of claim 1, wherein outputting the position of the target object relative to the vehicle comprises:

marking the target object and the position of the target object relative to the vehicle in the target image to obtain a marked image, and displaying the marked image; or issuing a voice message to notify the position of the target object relative to the vehicle.

7. The method of claim 1, wherein calculating the distance between the target object and the vehicle according to the first parameters and the second parameters using the monocular vision distance measurement algorithm comprising:

determining a rectangle that encompasses the target object in a target image, and obtaining first coordinates of two pixels on either end of a bottom edge of the rectangle according to the second parameters, the first coordinates being coordinates in an image plane;

determining an external parameter matrix, an internal parameter matrix, and a distortion matrix of the image capturing device according to the first parameters, and obtaining second coordinates of the two pixels according to the first coordinates, the second coordinates being coordinates in a road plane; and calculating the distance using a Euclidean distance formula according to the second coordinates.

8. An electronic device installed in a vehicle comprising:

at least one processor; and a storage device storing computer-readable instructions, which when executed by the at least one processor, cause the at least one processor to:

determine a target object;

obtain a plurality of original images of a scene in front of the vehicle;

detect a target image comprising the target object from the plurality of original images, comprising: detecting an object in one original image of the plurality of original images, calculate a degree of similarity between the object in the original image and the target object in a preset image, and comprising: adjusting a size of the original image and normalizing the original image by adjusting a center point of the original image and setting the center point to zero, extracting features of the object in the original image, and performing preset operations on the features to exclude the features with less information; and calculating a structural similarity index between the features of the object and the target object as the degree of similarity by a structural similarity index algorithm; and determine that the original image is the target image and the object is the target object when the degree of similarity is greater than a preset similarity threshold;

determine a position of the target object relative to the vehicle, comprising obtaining first parameters of an image capturing device that captures the plurality of original images and second parameters of the target object in the target image, the image capturing device comprising two monocular cameras, the first parameters comprising internal parameters of the monocular cameras and a relative position of the monocular cameras, and the second parameters comprising a width of the target object in the target image; perform binocular correction according to the first parameters and the second parameters, match corresponding pixels in two images captured by the two monocular cameras to obtain a disparity map, calculate disparity data of the two images according to the disparity map; according to the disparity data, calculate a distance of the position by using a similar triangle principle;

output the position of the target object relative to the vehicle; and notify a driver of the vehicle of the position of the target object relative to the vehicle.

9. The electronic device of claim 8, wherein the target object comprises a character string and/or a logo.

10. The electronic device of claim 8, wherein the at least one processor is further caused to:

control a driving recorder to capture a video of the scene in front of the vehicle;

extract an image sequence from the video; and obtain the plurality of original images from the image sequence.

11. The electronic device of claim 8, wherein the at least one processor is further caused to:

extract features of the object in the original image using a feature extraction algorithm; and calculate the degree of similarity between the object in the original image and the target object in the preset image according to the features using a feature matching algorithm.

12. A non-transitory storage medium having stored thereon computer-readable instructions that, when the computer-readable instructions are executed by a processor to implement the following method:

determining a target object;

obtaining a plurality of original images of a scene in front of a vehicle;

detecting a target image comprising the target object from the plurality of original images, comprising: detecting an object in one original image of the plurality of original images, calculating a degree of similarity between the object in the original image and the target object in a preset image, and comprising: adjusting a size of the original image and normalizing the original image by adjusting a center point of the original image and setting the center point to zero, extracting features of the object in the original image, and performing preset operations on the features to exclude the features with less information; and calculating a structural similarity index between the features of the object and the target object as the degree of similarity by a structural similarity index algorithm; and determining that the original image is the target image and the object is the target object when the degree of similarity is greater than a preset similarity threshold;

determining a position of the target object relative to the vehicle, comprising obtaining first parameters of an image capturing device that captures the plurality of original images and second parameters of the target object in the target image, the image capturing device comprising two monocular cameras, the first parameters comprising internal parameters of the monocular cameras and a relative position of the monocular cameras, and the second parameters comprising a width of the target object in the target image; performing binocular correction according to the first parameters and the second parameters, matching corresponding pixels in two images captured by the two monocular cameras to obtain a disparity map, calculating disparity data of the two images according to the disparity map; according to the disparity data, calculating a distance of the position by using a similar triangle principle;

outputting the position of the target object relative to the vehicle; and notifying a driver of the vehicle of the position of the target object relative to the vehicle.

13. The non-transitory storage medium of claim 12, wherein the target object comprises a character string and/or a logo.

14. The non-transitory storage medium of claim 12, wherein obtaining a plurality of original images of a scene in front of the vehicle comprises:

controlling a driving recorder to capture a video of the scene in front of the vehicle;

extracting an image sequence from the video; and obtaining the plurality of original images from the image sequence.

15. The non-transitory storage medium of claim 12, wherein calculating a degree of similarity between the object in the original image and the target object in a preset image comprises:

extracting features of the object in the original image using a feature extraction algorithm; and calculating the degree of similarity between the object in the original image and the target object in the preset image according to the features using a feature matching algorithm.

* * * * *